(12) United States Patent
Mochizuki et al.

(10) Patent No.: US 9,765,844 B2
(45) Date of Patent: Sep. 19, 2017

(54) SUSPENSION DEVICE

(71) Applicant: KAYABA INDUSTRY CO., LTD., Tokyo (JP)

(72) Inventors: Takahisa Mochizuki, Gifu (JP); Naoki Ito, Gifu (JP); Keiji Saito, Tokyo (JP)

(73) Assignee: KYB Corporation, Tokyo (JP)

( * ) Notice: Subject to any disclaimer, the term of this patent is extended or adjusted under 35 U.S.C. 154(b) by 190 days.

(21) Appl. No.: 14/411,144

(22) PCT Filed: Mar. 13, 2014

(86) PCT No.: PCT/JP2014/056765
§ 371 (c)(1),
(2) Date: Dec. 24, 2014

(87) PCT Pub. No.: WO2014/156698
PCT Pub. Date: Oct. 2, 2014

(65) Prior Publication Data
US 2015/0152939 A1   Jun. 4, 2015

(30) Foreign Application Priority Data

Mar. 27, 2013  (JP) .................................. 2013-065543

(51) Int. Cl.
*F16F 9/53* (2006.01)
*B62K 25/08* (2006.01)

(52) U.S. Cl.
CPC ............... *F16F 9/53* (2013.01); *F16F 9/535* (2013.01); *B62K 25/08* (2013.01); *F16F 2230/04* (2013.01)

(58) Field of Classification Search
CPC .... F16F 9/362; F16F 9/535; F16F 9/53; F16F 2230/04
See application file for complete search history.

(56) References Cited

U.S. PATENT DOCUMENTS

| 6,547,044 B2 * | 4/2003 | Lisenker | B60G 13/008 188/267 |
| 8,955,653 B2 * | 2/2015 | Marking | F16F 9/066 188/267.2 |
| 2007/0193839 A1 * | 8/2007 | Nakajima | F16F 9/535 188/267.2 |

FOREIGN PATENT DOCUMENTS

| JP | 07-091479 A | 4/1995 |
| JP | 07-190126 A | 7/1995 |
| JP | H11-082594 A | 3/1999 |
| JP | H11-173361 A | 6/1999 |
| JP | 2008-175369 A | 7/2008 |
| JP | 2008-215487 A | 9/2008 |

\* cited by examiner

*Primary Examiner* — Logan Kraft
*Assistant Examiner* — Abiy Teka
(74) *Attorney, Agent, or Firm* — Rabin & Berdo, P.C.

(57) ABSTRACT

A suspension device interposed between a vehicle body and a wheel, including a magnetic viscous fluid shock absorber in which a magnetic viscous fluid is sealed, a tube member composed of an outer tube connected to the vehicle body side and an inner tube connected to the wheel side and going into/out of the outer tube and accommodating the magnetic viscous fluid shock absorber, a lubricant liquid stored in the tube member, and a seal member closing a space between the inner tube and the magnetic viscous fluid shock absorber and preventing intrusion of the lubricant liquid to the wheel side.

4 Claims, 2 Drawing Sheets

SUSPENSION DEVICE

TECHNICAL FIELD

The present invention relates to a suspension device.

BACKGROUND ART

A suspension device is interposed between a vehicle body and a wheel in a vehicle in general. In the suspension device, a suspension spring for elastically supporting the vehicle body and a shock absorber generating a damping force for suppressing an extension/contraction motion of this suspension spring are provided in parallel. The suspension device suppresses transmission of an impact caused by irregularity on a road surface to the vehicle body and makes riding comfort of the vehicle favorable.

As disclosed in JP2008-175369A, shock absorbers used for the suspension device for an automobile include a magnetic viscous fluid shock absorber using a magnetic viscous fluid whose viscosity changes by an action of a magnetic field as an operating fluid.

SUMMARY OF INVENTION

The suspension device called a front fork suspending a front wheel of a saddle type vehicle such as a bicycle, a tricycle and the like includes a telescopic tube member composed of an outer tube and an inner tube going into/out of this outer tube, and the shock absorber is accommodated in this tube member. A lubricant liquid is stored in the tube member, and the lubricant liquid allows the inner tube to smoothly go into/out of the outer tube.

If the shock absorber for a saddle type vehicle is a usual hydraulic shock absorber using an operating oil as the operating fluid, the operating oil is also used as the lubricant liquid in general. However, if the magnetic viscous fluid shock absorber as described above is used as a shock absorber for a saddle type vehicle, the magnetic viscous fluid contains particles having ferromagnetism, and the specific gravity of the magnetic viscous fluid is heavier than the operating oil. Thus, if the magnetic viscous fluid (operating fluid) is used also as the lubricant liquid, a weight increase of the suspension device becomes remarkable.

The present invention has an object to provide a suspension device which can reduce a weight by suppressing a use amount of the magnetic viscous fluid.

A suspension device of an aspect of the present invention is a suspension device interposed between a vehicle body and a wheel and includes a magnetic viscous fluid shock absorber, in which a magnetic viscous fluid is sealed, including a cylinder, a piston rod going into and out of the cylinder, a piston held by the piston rod and defining two chambers formed in the cylinder, a magnetic viscous fluid, which is the magnetic viscous fluid, filled in the two chambers and whose viscosity changes by an action of a magnetic field, a passage allowing the two chambers to communicate with each other, and a viscosity adjustment portion adapted to adjust the viscosity of the magnetic viscous fluid passing through the passage, a tube member composed of an outer tube connected to a side of the vehicle body and an inner tube connected to a side of the wheel and going into and out of the outer tube and adapted to accommodate the magnetic viscous fluid shock absorber, a lubricant liquid stored in the tube member, and a seal member adapted to close a space between the inner tube and the magnetic viscous fluid shock absorber and to prevent intrusion of the lubricant liquid to the wheel side.

DESCRIPTION OF EMBODIMENTS

Figure 1:
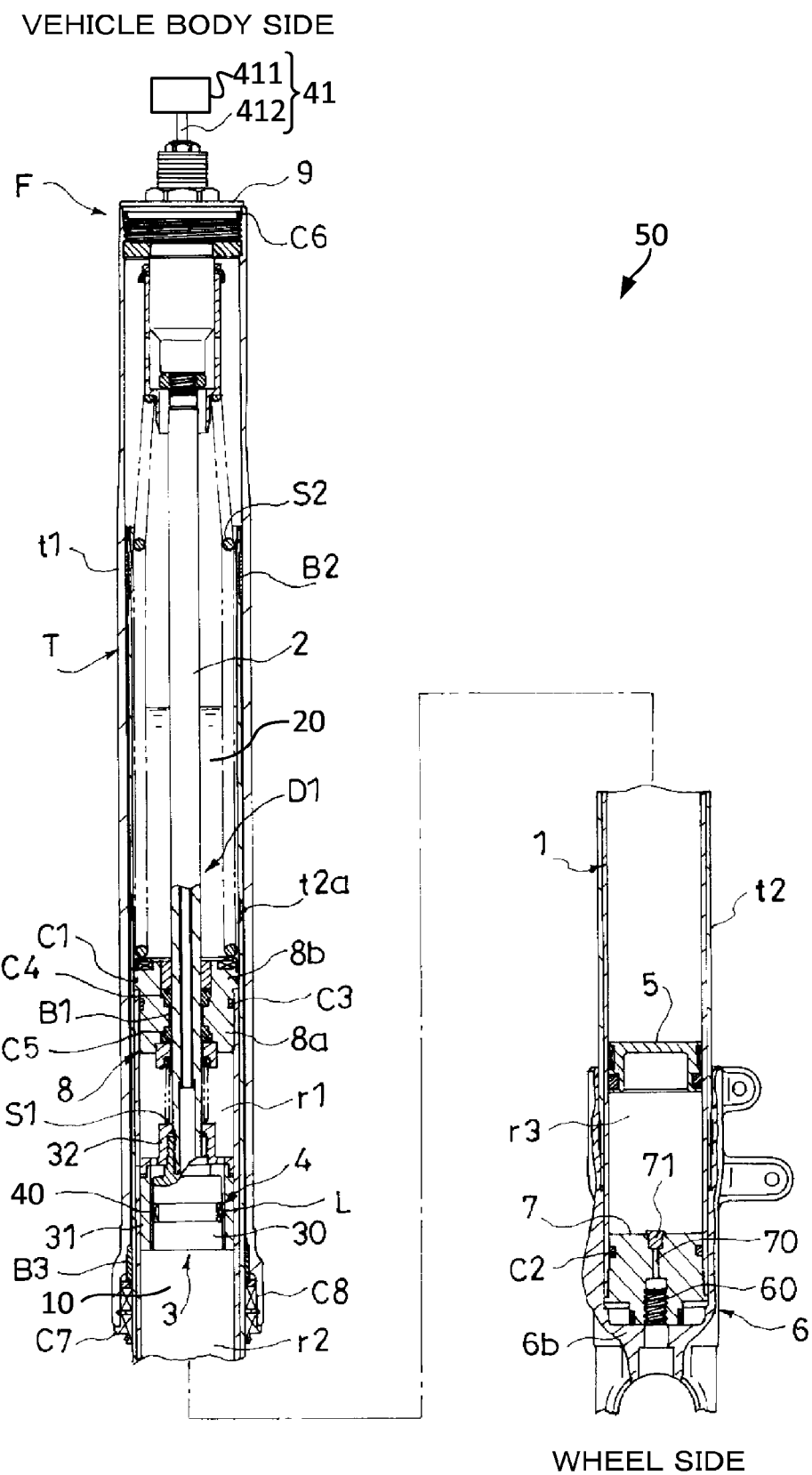
FIG. 1 is a longitudinal sectional view illustrating a major part of a suspension device according to an embodiment of the present invention.

An embodiment of the present invention will be described below by referring to the attached drawings. The same reference numerals given throughout some drawings indicate the same or corresponding components.

As illustrated in FIG. 1, a suspension device 50 according to this embodiment includes a magnetic viscous fluid shock absorber D1. The magnetic viscous fluid shock absorber D1 includes a cylinder 1, a piston rod 2 going into/out of the cylinder 1, a piston 3 held by the piston rod 2 and defining two chambers, that is, the chamber r1 and the chamber r2 formed in the cylinder 1, a magnetic viscous fluid 10 filled in the two chambers r1 and r2 and whose viscosity changes by an action of a magnetic field, a passage L allowing the two chambers r1 and r2 to communicate with each other, and a viscosity adjustment portion 4 for adjusting viscosity of the magnetic viscous fluid 10 passing through the passage L. The magnetic viscous fluid 10 is sealed inside the magnetic viscous fluid shock absorber D1.

The suspension device 50 is interposed between a vehicle body and a wheel. The suspension device 50 includes a tube member T, a lubricant liquid 20, and a seal member C1. The tube member T is composed of an outer tube t1 connected to a side of the vehicle body and an inner tube t2 connected to a side of the wheel and going into/out of the outer tube t1 and accommodating the magnetic viscous fluid shock absorber D1. The lubricant liquid 20 is stored in the tube member T. The seal member C1 closes a space between the inner tube t2 and the magnetic viscous fluid shock absorber D1 and prevents intrusion of the lubricant liquid 20 to the wheel side.

Explaining below in detail, the suspension device 50 is applied to a front fork suspending a front wheel of a saddle type vehicle such as a bicycle, a tricycle and the like. The front fork includes a pair of leg portions supporting the front wheel from both sides. In FIG. 1, only one leg portion F of the pair of leg portions is illustrated, while the other leg portion is not shown. The suspension device 50 is applied to the leg portion F. The suspension device 50 can be applied one of or both of the pair of leg portions of the front fork.

The pair of leg portions both includes the telescopic type tube members T each composed of the outer tube t1 and the inner tube t2, respectively. The outer tube t1 of each of the tube members T is connected through a vehicle-body side bracket, not shown, and is connected to a vehicle-body frame which is a frame of the vehicle body through this vehicle-body side bracket. The inner tube t2 of each of the tube members T is connected to an axle of the front wheel through a wheel-side bracket 6 mounted on a lower end portion thereof, respectively.

The leg portion F accommodates the magnetic viscous fluid shock absorber D1 in the tube member T. The magnetic viscous fluid shock absorber D1 uses the magnetic viscous fluid 10 as an operating fluid. In this embodiment, the magnetic viscous fluid shock absorber D1 is set as a single-rod type, and the piston rod 2 stands on one side of the piston 3 and extends to an outside of the cylinder 1. Moreover, the magnetic viscous fluid shock absorber D1 includes a gas chamber r3 and a free piston 5 and is set to a single cylinder type. The gas chamber r3 compensates for a change in an in-cylinder capacity for a volume of a portion of the piston rod 2 going into/out of the cylinder 1. In other words, the gas chamber r3 compensates for the change in the capacity of the cylinder 1 according to the volume for a portion of the piston rod 2 going into/out of the cylinder 1. The free piston 5 defines the gas chamber r3 in the cylinder 1.

The cylinder 1 is supported by the wheel-side bracket 6 and stands in a shaft center portion of the inner tube t2. Specifically, the cylinder 1 is screwed with an outer periphery of a sealing member 7, and the sealing member 7 is fixed to a bottom portion 6b of the wheel-side bracket 6 formed in a cylindrical shape with a bottom by a bolt 60. A space between the sealing member 7 and the cylinder 1 is closed by a seal member C2 made of an annular O-ring.

On an upper side in FIG. 1 of the cylinder 1, a rod guide 8 is provided. The rod guide 8 has an annular shape and includes a small diameter portion 8a and a large diameter portion 8b continuing coaxially and having different outer diameters. With an outer periphery of the small diameter portion 8a, the cylinder 1 is screwed. The large diameter portion 8b extends to an outside from the cylinder 1. The rod guide 8 is penetrated by the piston rod 2. The piston rod 2 penetrates a shaft center portion of the rod guide 8.

A space between the cylinder 1 and the small diameter portion 8a is closed by a seal member C3 made of an annular O-ring. A space between the rod guide 8 and the piston rod 2 is closed by a pair of upper and lower annular seal member C4 and seal member C5. That is, by means of the above-described configuration, upper and lower openings of the cylinder 1 are closed. As a result, the magnetic viscous fluid 10 stored in the cylinder 1 does not leak to the outside. The magnetic viscous fluid 10 is not mixed with the lubricant liquid 20 stored between the tube member T and the magnetic viscous fluid shock absorber D1, either. The configuration for sealing the magnetic viscous fluid 10 in the magnetic viscous fluid shock absorber D1 is not limited to the above and can be changed as appropriate.

The piston rod 2 is held in a state suspended by a cap member 9 closing the upper opening of the tube member T. The piston rod 2 stands in a shaft center portion of the outer tube t1. A lower side in FIG. 1 of the piston rod 2 is pivotally supported movably in an axial direction by the rod guide 8 through an annular bush B1 fitted in an inner periphery of the rod guide 8. The piston rod 2 goes into/out of the cylinder 1 in a pivotally supported state as above.

The piston rod 2 is formed in a cylindrical shape. In an inner side of the piston rod 2, a wiring 412 allowing an electric current to flow through a coil 40 which will be described later passes. At a distal end of the piston rod 2, the piston 3 is held. On an outer periphery of the piston rod 2, a rebound spring S1 is provided. The rebound spring S1 is made of an elastic body and is arranged between the piston 3 and the rod guide 8. The rebound spring S1 absorbs an impact when the magnetic viscous fluid shock absorber D1 extends to the maximum. The rebound spring S1 of this embodiment is made of a coil spring but it is only necessary that the spring is an elastic body and may be rubber, for example.

The piston 3 includes a piston assy 30, a ring 31, and a plate 32. The piston assy 30 and the ring 31 are both formed of a magnetic body. The ring 31 has an annular shape. The ring 31 is arranged on an outer periphery of the piston assy 30 and forms a passage L between itself and the piston assy 30. The passage L is an annular gap formed between the piston assy 30 and the ring 31. The plate 32 has an annular shape. The plate 32 connects the ring 31 to the piston assy 30. On the plate 32, a hole (without reference numeral) penetrating vertically is formed so as not to prevent communication between the two chambers r1 and r2 through the passage L.

The viscosity adjustment portion 4 adjusts viscosity of the magnetic viscous fluid 10 passing through the passage L. The viscosity adjustment portion 4 is composed of the coil 40 provided on the piston assy 30 and a conduction portion 41 conducting the coil 40. The coil 40 is wound around the outer periphery of the piston assy 30. The conduction portion 41 includes a controller 411 capable of adjusting a current amount flowing through the coil 40 and a wiring 412 connecting the controller 411 and the coil 40 to each other. The conduction portion 41 generates a magnetic field in the passage L by conducting the coil 40. The controller 411 is provided on an outer side of the tube member T. Thus, a part of the wiring 412 passes inside the piston rod 2 and extends to an outside of the tube member T. The current amount flowing through the coil 40 may be adjusted in accordance with a control rule by the controller 411 or may be adjusted in multi stages or continuously by an operation of a user.

The magnetic viscous fluid 10 is a liquid in which particles having ferromagnetism are distributed in a liquid such as oil and the like and becomes highly viscous by an action of the magnetic field. Viscosity of the magnetic viscous fluid 10 is changed in accordance with intensity of the magnetic field and returns to an original state if the magnetic field is removed. The magnetic viscous fluid 10 is filled in the two chambers r1 and r2 in the cylinder 1. In the two chambers r1 and r2, the chamber formed on an upper side in FIG. 1 of the piston 3 is also referred to as a rod-side chamber r1 and the chamber formed on a lower side in FIG. 1 of the piston 3 is also referred to as a piston-side chamber r2 below.

At the time of extension of the magnetic viscous fluid shock absorber D1 when the piston rod 2 retreats from the cylinder 1, the magnetic viscous fluid 10 in the rod-side chamber r1 pressurized by the piston 3 passes through the passage L and moves to the piston-side chamber r2. At the time of compression of the magnetic viscous fluid shock absorber D1 when the piston rod 2 enters into the cylinder 1, the magnetic viscous fluid 10 in the piston-side chamber r2 pressurized by the piston 3 passes through the passage L and moves to the rod-side chamber r1. Thus, the magnetic viscous fluid shock absorber D1 generates a damping force caused by resistance of the magnetic viscous fluid 10 passing through the passage L at the time of extension/contraction. This resistance changes in accordance with the viscosity of the magnetic viscous fluid 10, and the viscosity adjustment portion 4 can adjust this viscosity. Thus, the viscosity adjustment portion 4 can adjust the damping force of the magnetic viscous fluid shock absorber D1.

The piston-side chamber r2 formed in the cylinder 1 is defined by the free piston 5 from the gas chamber r3. In the gas chamber r3, a gas is sealed while being compressed and pressurizes the magnetic viscous fluid 10. Then, when the piston rod 2 retreats from the cylinder 1, the free piston 5 moves to the upper side in FIG. 1 and the gas chamber r3 enlarges, while when the piston rod 2 enters into the cylinder 1, the free piston 5 moves to the lower side in the Figure and the gas chamber r3 contracts. The gas chamber r3 compensates for the change in the capacity of the cylinder 1 according to the volume for a portion of the piston rod 2 going into/out of the cylinder 1 as described above.

The sealing member 7 closes the lower opening of the cylinder 1. In the sealing member 7, a gas injection path 70 for injecting a gas into the gas chamber r3 is formed. An opening of the gas injection path 70 on a side of the gas chamber is closed by a rubber plug 71. Thus, a gas can be supplied to the gas chamber r3 by sticking a needle for injecting the gas into the rubber plug 71. In this case, by removing the needle, the rubber plug 71 is elastically deformed, and a needle hole is closed. An injecting method of the gas into the gas chamber r3 is not limited to the above and can be changed as appropriate such as use of an air valve or the like.

In an overlapping portion between the outer tube t1 and the inner tube t2, a cylindrical gap e1 (see FIG. 2) is formed. In the cylindrical gap e1, a pair of bush B2 and bush B3 is provided. The bush B2 and the bush B3 pivotally support the inner tube t2 capable of going into/out of the outer tube t1. Between the tube member T and the magnetic viscous fluid shock absorber D1, the suspension spring S2 and the lubricant liquid 20 are stored. The suspension spring S2 urges the magnetic viscous fluid shock absorber D1 in an extension direction and elastically supports the vehicle body. The lubricant liquid 20 lubricates sliding surfaces of the bush B2 and the bush B3. The lubricant liquid 20 is normal oil such as an operating oil used in a hydraulic shock absorber. The lubricant liquid 20 can freely move between an inside and an outside (the cylindrical gap e1) of the inner tube t2 through a hole t2a formed in the inner tube t2.

Figure 2:
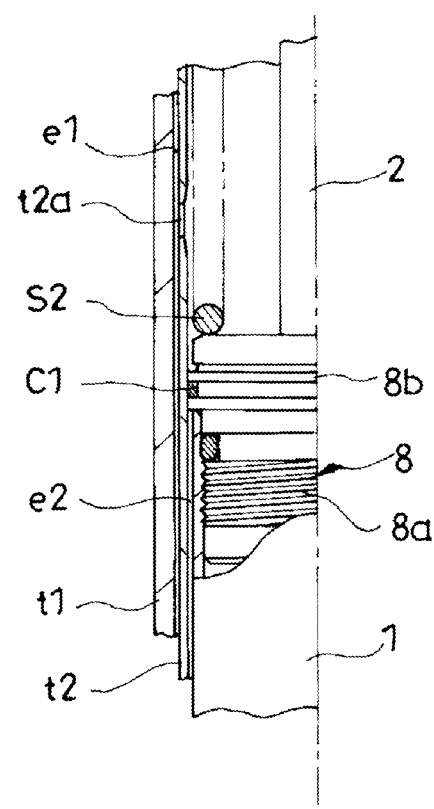
FIG. 2 is a view illustrating a rod guide part of a magnetic viscous fluid shock absorber in the suspension device according to the embodiment of the present invention in an enlarged manner.

With an inner periphery of an upper part in FIG. 1 of the outer tube t1, the cap member 9 is screwed. With an outer periphery of a lower part in FIG. 1 of the inner tube t2, the wheel-side bracket 6 is screwed. A space between the cap member 9 and the outer tube t1 is sealed by the seal member C6 made of an annular O-ring. A space between the inner tube t2 and the large diameter portion 8b of the rod guide 8 is sealed by the seal member C1 made of an annular O-ring. A lower opening of the cylindrical gap e1 is sealed by an annular seal member C7 and seal member C8 made of a dust seal and an oil seal. By means of such configuration, the lubricant liquid 20 stored in the tube member T does not leak to the outside air side. In this embodiment, as illustrated in FIG. 2, the seal member C1 is mounted on the outer periphery of the large diameter portion 8b of the rod guide 8. Thus, the lubricant liquid 20 does not move to the wheel side from the seal member C1 or does not enter into a gap e2 between the cylinder 1 and the inner tube t2. Thus, even without providing a seal member such as an O-ring or the like between the inner tube t2 and the wheel-side bracket 6, the lubricant liquid 20 does not leak from between the inner tube t2 and the wheel-side bracket 6.

A working effect of the suspension device 50 will be explained below.

The suspension device 50 includes the magnetic viscous fluid shock absorber D1, the tube member T, the lubricant liquid 20 stored in the tube member T, and the seal member C1 closing a space between the inner tube t2 and the magnetic viscous fluid shock absorber D1 and preventing intrusion of the lubricant liquid 20 to the wheel side. According to the above-described configuration, the lubricant liquid 20 does not move to the wheel side from the seal member C1.

Thus, according to the above-described configuration, even though the magnetic viscous fluid shock absorber D1 is accommodated in the tube member T and sliding surfaces of the pair of bush B2 and bush B3 pivotally supporting the inner tube t2 capable of going into/out of the outer tube t1 are lubricated with the lubricant liquid 20, the use amount of the magnetic viscous fluid 10 can be suppressed, and weight reduction can be realized. This also applies to a case in which the magnetic viscous fluid 10 is used as the lubricant liquid 20. Moreover, according to the above-described configuration, the magnetic viscous fluid 10 is sealed in the magnetic viscous fluid shock absorber D1. Thus, according to the above-described configuration, normal oil such as an operating oil which is not the magnetic viscous fluid 10 can be used as the lubricant liquid 20 stored between the tube member T and the magnetic viscous fluid shock absorber D1, whereby the use amount of the magnetic viscous fluid 10 can be further suppressed, and further weight reduction can be realized.

In this embodiment, the magnetic viscous fluid shock absorber D1 includes the annular rod guide 8 mounted on the opening end portion of the cylinder 1 and pivotally supporting the piston rod 2 movably in the axial direction. Moreover, the rod guide 8 includes the small diameter portion 8a inserted into the cylinder 1 and the large diameter portion 8b continuing to the small diameter portion 8a and extending to the outside of the cylinder 1. Moreover, the seal member C1 is mounted on the outer periphery of the large diameter portion 8b.

According to the above-described configuration, intrusion of the lubricant liquid 20 can be prevented for the whole region of the gap e2 between the cylinder 1 and the inner tube t2. As a result, the use amount of the lubricant liquid 20 can be suppressed, and further weight reduction can be realized. Moreover, by providing the seal member C1 on the rod guide 8, a new component for mounting the seal member C1 does not have to be added. Specifically, in this embodiment, a groove for seal mounting is worked to be formed on the rod guide 8, and the seal member C1 is mounted only by mounting the seal member C1 in this groove. Thus, complication of the configuration involved in addition of the seal member C1 can be suppressed.

In this embodiment, the magnetic viscous fluid 10 is sealed in the cylinder 1. Moreover, the magnetic viscous fluid shock absorber D1 includes the free piston 5 in the cylinder 1, defining the gas chamber r3 for compensating for the change in the capacity of the cylinder 1 according to the volume for a portion of the piston rod 2 going into/out of the cylinder 1.

According to the above-described configuration, the magnetic viscous fluid shock absorber D1 is set to the single cylinder type, and its configuration is simple. Thus, according to the above-described configuration, the magnetic viscous fluid shock absorber D1 can be easily accommodated in the tube member T, and a size increase can be avoided.

If the magnetic viscous fluid shock absorber D1 is set to an inverted type, the seal member C1 closing a space between the inner tube t2 and the magnetic viscous fluid shock absorber D1 and preventing intrusion of the lubricant liquid 20 to the wheel side closes a space between the inner tube t2 and the piston rod 2 or a space between the inner tube t2 and the cylinder 1. However, in the former case, there is a concern that a stroke amount of the magnetic viscous fluid shock absorber D1 is limited. Moreover, in the latter case, the seal member C1 needs to be in sliding contact with an outer peripheral surface of the cylinder 1 or an inner peripheral surface of the inner tube t2, and thus, a structure becomes complicated.

In this embodiment, the cylinder 1 is connected to the wheel side and the piston rod 2 is connected to the vehicle body side. And according to this configuration, the magnetic viscous fluid shock absorber D1 is set to an upright type, and the cylinder 1 is accommodated in the inner tube t2 connected to the wheel side. Thus, the suspension device 50 preferably has the above-described configuration.

The embodiment of the present invention has been explained, but the above-described embodiment illustrates only a part of an application example of the present invention and is not intended to limit a technical scope of the present invention to the specific configuration of the above-described embodiment.

For example, the configuration of the magnetic viscous fluid shock absorber D1 can be changed as appropriate. The magnetic viscous fluid shock absorber D1 may be set to a double rod type or a multiple cylinder type as long as the magnetic viscous fluid 10 used as the operating fluid is sealed in the magnetic viscous fluid shock absorber D1 so as not to flow out to the outside air side or into the tube member T. The magnetic viscous fluid shock absorber D1 may be also set to the inverted type.

The mounting position of the seal member C1 or the configuration for mounting the seal member C1 is not limited to the above. In mounting the seal member C1, a groove may be formed on the outer periphery of the cylinder 1, for example, and the seal member C1 may be mounted in this groove. In mounting the seal member C1, a component for mounting the seal member C1 may be newly added.

The present application claims for priority based on Japanese Patent Application No. 2013-065543 filed with Japan Patent Office on Mar. 27, 2013 and all the contents of this application are incorporated in this description by reference.

The invention claimed is:

1. A suspension device interposed between a vehicle body and a wheel, comprising:
   a magnetic viscous fluid shock absorber, in which a magnetic viscous fluid is sealed, including a cylinder, a piston rod going into and out of the cylinder, a piston held by the piston rod and defining two chambers formed in the cylinder, a magnetic viscous fluid, which is the magnetic viscous fluid, filled in the two chambers and whose viscosity changes by an action of a magnetic field, a passage allowing the two chambers to communicate with each other, and a viscosity adjustment portion adapted to adjust the viscosity of the magnetic viscous fluid passing through the passage;
   a tube member composed of an outer tube connected to a side of the vehicle body and an inner tube connected to a side of the wheel and going into and out of the outer tube and adapted to accommodate the magnetic viscous fluid shock absorber;
   a lubricant liquid stored in the tube member; and
   a seal member adapted to close a space between the inner tube and the magnetic viscous fluid shock absorber and to prevent intrusion of the lubricant liquid to the wheel side,
   wherein the inner tube includes an opening to permit the lubricant liquid to pass between a chamber inside the inner tube and a gap between the inner tube and the outer tube.

2. The suspension device according to claim 1,
   wherein the magnetic viscous fluid is sealed in the cylinder; and
   the magnetic viscous fluid shock absorber further includes a free piston adapted to define a gas chamber compensating for a change in a capacity of the cylinder according to a volume for a portion of the piston rod going into or out of the cylinder in the cylinder.

3. The suspension device according to claim 1, wherein the magnetic viscous fluid shock absorber further includes an annular rod guide mounted on an opening end portion of the cylinder and adapted to pivotally support the piston rod movably in an axial direction;
   the rod guide includes a small diameter portion inserted into the cylinder and a large diameter portion continuing to the small diameter portion and extending to an outside of the cylinder; and
   the seal member is mounted on an outer periphery of the large diameter portion.

4. The suspension device according to claim 3, wherein the cylinder is connected to the wheel side and the piston rod is connected to the vehicle body side.

* * * * *